United States Patent Office 2,917,533
Patented Dec. 15, 1959

2,917,533

DIALKYLAMINOALKYL ESTERS OF PHOSPHONIC ACID AND METHOD OF PREPARING SAME

Alfred Burger, Charlottesville, Va., assignor to Virginia-Carolina Chemical Corporation, Richmond, Va., a corporation of Virginia No Drawing. Application May 12, 1954
Serial No. 429,406

17 Claims. (Cl. 260—461)

This invention is concerned with a novel process for the preparation of dialkylaminoalkyl phosphonates and phosphinates.

An object of my invention is to provide an easy method for the esterification of phosphinic acids, phosphonic acids and acid esters of phosphonic acids.

A specific object of my invention is to prepare dialkylaminoalkyl phosphonates and phosphinates.

A further object is to introduce dialkylaminoalkyl ester groups into phosphonic and phosphinic acid molecules.

An additional object is to provide a source of and to prepare, intermediates useful in the further synthesis of fungicidally active products.

These, and other objects, are accomplished by my process for the reaction of dialkylaminoalkyl chlorides with phosphonic and phosphinic acids. This type esterification reaction has not been previously reported for any class of phosphorus esters. Bis(dimethylaminoethyl) arylphosphonates have been prepared [Bost et al., J. Org. Chem., 18, 362 (1953)] from the silver salts of a few arylphosphonic acids and 2-dimethylaminoethyl chloride. The preparation of such silver salts is, of course, expensive and not applicable for commercial use. Furthermore, the preparation of mono dialkylaminoalkyl esters has not been reported by this silver-salt method.

The esterification of benzilic and salicylic acids has been reported [Horenstein and Pählicke, Ber., 71, 1644 (1938)] to result from refluxing the corresponding acid with diethylaminoethyl chloride in isopropyl alcohol. Both benzilic and salicylic acids are however carboxylic acids, that is, they are organic compounds containing the COOH acid group whereas the acids involved in the process of my invention are phosphorus-containing acids. It is well established in the field of organic chemistry that reaction conditions and processes which hold for one class of organic compounds do not hold for other classes; for example, the process for esterification of a carboxylic acid will not necessarily work for sulfur-containing acids, or for phosphorus or boron-containing acids. The process of Horenstein and Pählicke will not yield dialkylaminoalkyl phosphonates and phosphinates and the practice of my invention therefore constitutes a new approach to these products.

The reaction conditions reported by these prior workers for the esterification of carboxylic acids were to reflux a mixture of the diethylaminoethyl chloride and the carboxylic acid in isopropyl alcohol. When these conditions were tried with benzhydrylphosphonic acid and diethylaminoethyl chloride in isopropyl alcohol, the exclusive product was the dimer of diethylaminoethyl chloride, a well known compound described by Bartlett and coworkers [J. Am. Chem. Soc., 69, 2971 (1947)] and named tetramethylpiperazinium dichloride.

Since this dimer was the exclusive product of the reaction of diethylaminoethyl chloride with phosphonic or phosphinic acids, it was assumed that with these acids the rate of dimerization was much faster than the rate of esterification. Furthermore it was assumed that the reaction must proceed through an ethyleneimmonium ion intermediate. Therefore, my novel process was designed to reverse this reaction preference, to increase the rate of esterification, and if the overall reaction proceeds through an intermediate to obtain reaction of this intermediate with the acid before it undergoes dimerization. These objects are accomplished, as specifically illustrated below in the examples, by heating an isopropyl alcohol solution of the phosphonic or phosphinic acid to a slow reflux and then adding dropwise a dilute solution of the dialkylaminoalkyl chloride in isopropyl alcohol. This method provides optimum conditions for reaction between the intermediate and the phosphonic or phosphinic acid.

The novel esters produced by the practice of my invention are characterized by the following formula:

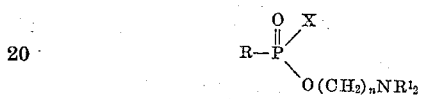

in which R is a member of the group consisting of aryl and aralkyl, X stands for a member of the group consisting of aryl, O-alkyl and $O(CH_2)_nNR^1_2$ in which $n$ is an integer from 2 to 3 and $R^1$ is an alkyl group having from 1 to 2 carbon atoms.

The dialkylaminoalkyl phosphonates and phosphinates, prepared by my process, are useful as pharmaceuticals and by intraperitoneal injection in guinea pigs have shown antihistaminic activity. 2-dimethylaminoethyl diphenylphosphinate methiodide afforded excellent protection against cholinergic spasm in the isolated guinea pig intestinal strip method at a dilution of $1 \times 10^6$.

The esters of my invention are intermediates for the preparation of the methiodide derivatives which have shown fungicidal, contact herbicidal and plant growth regulatory action. These methiodides show definite inhibition of peach brown rot and apple bitter rot at dilutions of $1 \times 10^4$. Specifically, 2-diethylaminoethyl diphenylphosphinate methiodide at a concentration of 100 parts per million showed 100% inhibition of *Glomerella cingulata* and 98% inhibition of *Monilinia fructicola*. 2-dimethylaminoethyl diphenylphosphinate methiodide and 2-diethylaminoethyl ethyl benzhydrylphosphonate methiodide both showed 100% inhibition of *Glomerella cingulata* and *Monilinia fructicola* at concentrations of 100 parts per million. In plant growth regulatory tests these three methiodides in the standard lanolin paste test were translocated from the plant stem, produced severe contact burn and showed plant stunting of approximately 50%. In a 0.1% water solution sprayed on the soil, these methiodides killed all plants.

I have found that the process of my invention proceeds only if the tertiary amino group and the chlorine atom are separated by two or three carbon atoms. Of available significant higher dialkylaminoalkyl halides, 8-diethylaminooctyl chloride or iodide did not react to give esters of the type represented by the general formula given above. It appears likely that dialkylaminoethyl and dialkylaminopropyl chlorides do not react by a simple ionic displacement but that they undergo cyclization to intermediate ethyleneimmonium or propyleneimmonium ions, respectively, which then suffer nucleophilic attack by the phosphonic and phosphinic acids.

The dialkylaminoalkyl esters of my invention could not be prepared from the respective phosphonyl and phosphinyl chlorides with dialkylaminoalkanols or their sodium derivatives.

All temperatures are on the centigrade scale.

EXAMPLE 1

Diphenylphosphinic acid

To a gently refluxing solution of phenylmagnesium bromide, prepared in the usual manner by reacting 103 g. (5.48 moles) of magnesium metal with 860 g. (5.48 moles) of bromobenzene in 2 l. of absolute ether, was added 520 g. (2.74 moles) of diethylphosphoroamidic dichloride over a period of four hours. The resulting solution was then slowly refluxed for eight hours, and after cooling, the thick yellow oily mixture was hydrolyzed by the addition of a solution of 700 g. of ammonium chloride in 3 l. of cold water. Ice was added when necessary to the mixture to prevent the temperature from rising above the boiling point of the ether. A thick gelatinous mass formed which eventually went into the ether layer. It was separated from the aqueous layer and treated with 2 l. of concentrated hydrochloric acid. The ether was removed under reduced pressure and the residue was refluxed for ten hours. Upon cooling, the product completely crystallized from the solution, the aqueous layer was decanted, and the crystals were washed several times with water. Recrystallization from a minimum amount of hot ethanol yielded 220 g. (37%) of the colorless acid which melted at 190–193°.

EXAMPLE 2

9-fluorenylphosphonic acid

A mixture of 14.57 g. (0.062 mole) of 9-bromofluorene, prepared by the method of Wittig-Felletshin from fluorene and N-bromosuccinimide [Ann., 555, 133 (1944)] and 10.3 g. (0.062 mole) of triethyl phosphite was refluxed at 160° for 6 hours under a Cooper-Fasce still head with removal of ethyl bromide as it was formed. The residue was heated at 80° and 15 mm. pressure for 2 hours to remove unreacted triethyl phosphite, and the resulting yellow oil was hydrolyzed by boiling with 100 ml. of 36% hydrochloric acid for 20 hours. The aqueous solution was decanted and the solid product dissolved in 5% sodium carbonate solution; the alkaline solution was filtered and acidified with the formation of an amorphous yellow precipitate. This was dissolved in 1000 ml. of boiling ethyl ether; the ether layer was dried over anhydrous sodium sulfate, filtered, and the solvent removed leaving a viscous yellow oil. The oil was extracted with benzene and left behind an insoluble colorless solid. The solid phosphonic acid was recrystallized from a mixture of acetone and petroleum ether; it decomposed at 258° (evac. tube) without melting. The yield was 5 g. (31%).

*Analysis.*—Calcd. for $C_{13}H_{11}O_3P$: C, 63.41; H, 4.50. Found: C, 63.19; H, 4.58.

EXAMPLE 3

Benzhydrylphosphonic acid

A mixture of 247 g. (1.0 mole) of pure benzhydryl bromide and 182.8 g. (1.1 moles) of freshly distilled triethyl phosphite was refluxed at 150° for three hours under a Cooper-Fasce still head which permitted removal of ethyl bromide. When ethyl bromide ceased to distill, a thick yellow oily residue remained in the flask. This oil was a mixture of diethyl benzhydrylphosphonate and sym.-tetraphenylethane which was very difficult to separate. It was therefore hydrolyzed by boiling with 300 ml. of 36% hydrochloric acid. After several hours, a colorless solid began to appear in the flask. Refluxing was continued for a total of twenty hours. The cooled liquid was decanted from the solid material; the latter was washed with several portions of water, and dissolved in excess 5% sodium carbonate solution. The insoluble tetraphenylethane was filtered, and the alkaline filtrate was acidified with 10% hydrochloric acid with the precipitation of colorless benzhydrylphosphonic acid. Recrystallization from 50% ethanol gave 204 g. (82%) of the acid which melted at 235–238°. The literature lists the melting point as 234–237°.

*Analysis.*—Calcd. for $C_{13}H_{13}O_3P$: C, 62.90; H, 5.28. Found: C, 62.62; H, 5.42.

EXAMPLE 4

Ethyl hydrogen benzhydrylphosphonate

When the reaction mixture from triethyl phosphite and benzhydryl bromide in a run similar to that just described (Example 3) was refluxed slowly with only 50 g. (0.5 mole) of 36% hydrochloric acid for 1.5 hours, the diethyl ester was only partially hydrolyzed. The semi-solid product was treated with 5% sodium carbonate solution and the aqueous layer was decanted carefully from the remaining oil. The latter apparently contained unchanged diethyl benzhydrylphosphonate (contaminated with some tetraphenylethane) since it could be further hydrolyzed to the corresponding phosphonic acid by additional boiling for ten hours with an excess of hydrochloric acid. The carbonate solution was acidified with 10% hydrochloric acid, whereupon a colorless solid precipitated; it melted from 90–140° and consisted of a mixture of benzhydrylphosphonic acid and its monoethyl ester. The free phosphonic acid was separated from the ester by treating the mixture with one 1,000 ml., and two 500 ml. portions of boiling water; the insoluble ester melted during this treatment but resolidified upon cooling. Recrystalization of the crude product from carbon tetrachloride-petroleum ether gave 69 g. (25%) of colorless crystals melting at 120–122°.

*Analysis.*—Calcd. for $C_{15}H_{17}O_3P$: C, 65.21; H, 6.20. Found: C, 65.44; H, 5.94.

EXAMPLE 5

2-diethylaminoethyl diphenylphosphinate

A solution of 9.35 g. (0.069 mole) of 2-diethylaminoethyl chloride, prepared from the hydrochloride by the method of Burtner [J. Am. Chemical Soc., 71, 2578 (1949)] in 60 ml. of dry 2-propanol was added dropwise to a refluxing solution of 15 g. (0.069 mole) of diphenylphosphinic acid in 100 ml. of dry 2-propanol with stirring. The mixture was refluxed for 6 hours. A small amount of colorless precipitate that formed was filtered off and the remaining solution evaporated to dryness. The yellow oily residue was treated with 50 ml. of 5% sodium carbonate solution to remove any unreacted acid, and extracted three times with 50 ml. portions of ethyl ether. The combined ether solutions were dried over anhydrous sodium sulfate, filtered, and evaporated to dryness. The residue was heated at 60° (15 mm.) for one hour to remove any remaining 2-diethylaminoethyl chloride. The light-colored oily product was then dissolved in 30 ml. of absolute ethyl ether (dried over calcium hydride) and treated dropwise with ethereal hydrogen chloride. The first portion of the resulting precipitate remained only; when the product began to appear as a solid, the other solution was decanted and the oil washed several times with 10 ml. portions of absolute ether. The combined ether solutions were made acidic to Congo red paper with ethereal hydrogen chloride. The colorless hydrochloride salt which precipitated was extremely hygroscopic.

Methiodide salt

The free base was liberated from the hygroscopic hydrochloride by the addition of 5% sodium carbonate solution. The basic solution was extracted with several 30 ml. portions of ethyl ether; the combined ether solutions were dried over anhydrous sodium sulfate, filtered, and the ether removed by evaporation. The free base was dissolved in 10 ml. of absolute ether and heated on a steam bath with a slight excess of methyl iodide for 5 minutes. The resulting crystalline methiodide was recrystallized from absolute ethanol-ether mixture. The colorless product melted at 193–194° (dec., evac. tube).

*Analysis.*—Calcd. for $C_{19}H_{27}INO_2P$: C, 49.68; H, 5.93. Found: C, 49.58; H, 5.93.

EXAMPLE 6

2-dimethylaminoethyl diphenylphosphinate

This compound was prepared similar to its homologue, as described in Example 5, by adding dropwise 2.69 (0.025 mole) of 2-dimethylaminoethyl chloride in 50 ml. of dry 2-propanol to a refluxing solution of 5.56 g. (0.026 mole) of diphenylphosphinic acid in 100 ml. of dry 2-propanol with stirring. The resulting solution was refluxed for 4 hours. The hydrochloride salt of the oily 2-dimethylaminoethyl diphenylphosphinate was fractionally precipitated but remained extremely hydroscopic; the methiodide salt was a colorless solid which melted at 191–192° (dec., evac. tube).

*Analysis.*—Calcd. for $C_{17}H_{23}INO_2P$: C, 47.34; H, 5.38. Found: C, 47.10; H, 5.33.

EXAMPLE 7

3-diethylaminopropyl diphenylphosphinate

To a stirred solution of 10 g. (0.046 mole) of diphenylphosphinic acid in 100 ml. of dry 2-propanol heated to slow reflux was added dropwise 6.9 g. (0.046 mole) of 3-diethylaminopropyl chloride, prepared by the method of Gilman and Shirley in 50 ml. of dry 2-propanol. The resulting mixture was refluxed for 6 hours; the solvent was removed and the free base liberated in the usual manner with 5% sodium carbonate. This oily product was heated to 75° (15 mm.) for 1 hour in order to remove unreacted 3-diethylaminopropyl chloride. The hydrochloride of the base was prepared as in a previous synthesis. This salt was slightly hygroscopic, but several recrystallizations from a dry ethanol-ethyl acetate mixture gave a pure, colorless solid which melted at 133–134° (evac. tube).

*Analysis.*— Calcd. for $C_{19}H_{27}ClNO_2 P$: C, 62.03; H, 7.40. Found: C, 62.01; H, 7.38.

EXAMPLE 8

2-diethylaminoethyl ethyl benzhydrylphosphonate

A solution of 5.42 g. (0.04 mole) of 2-diethylaminoethyl chloride in 75 ml. of dry 2-propanol was added dropwise to a refluxing solution of 11.04 g. (0.04 mole) of ethyl hydrogen benzhydrylphosphonate in 150 ml. of dry 2-propanol with constant stirring; the mixture was refluxed for 7 hours. The resulting oily base, which was obtained as described in previous experiments, was dissolved in 20 ml. of absolute ethyl ether and treated dropwise with ethereal hydrogen chloride. The first portion of the precipitate was a thick colorless oil. When the precipitate gave evidence of solidification, the ether solution was decanted and the oily precipitate was washed several times with absolute ether. Addition of ethereal hydrogen chloride to the combined ether solutions gave a colorless hygroscopic material. The base was again liberated from this salt and the solid methiodide salt was made. This colorless derivative, after several recrystallizations from dry ethanol-ether melted at 127–128° (evac. tube).

*Analysis.*—Calcd. for $C_{22}H_{33}INO_3P$: C, 51.07; H, 6.43. Found: C, 50.88; H, 6.14.

EXAMPLE 9

2-dimethylaminoethyl ethyl benzhydrylphosphonate

This compound was prepared by reacting 7.1 g (0.066 mole) of 2-dimethylaminoethyl chloride in 75 ml. of dry 2-propanol with 18.5 g. (0.066 mole) of ethyl hydrogen benzhydrylphosphonate in 150 ml. of dry 2-propanol in the manner described above. The resulting solution was refluxed for 7 hours. A solid hydrochloride of the oily base was made by the dropwise addition of ethereal hydrogen chloride to a solution of the free base in dry ether. After several recrystallizations from ethyl acetate, the colorless salt melted at 125–126° (evac. tube).

*Analysis.*—Calcd. for $C_{19}H_{27}ClNO_3P$: C, 59.45; H, 7.09. Found: C, 59.04; H, 7.16.

EXAMPLE 10

Bis(3-diethylaminopropyl) 9-fluorenylphosphonate

A solution of 13.46 g. (0.09 mole) of 3-diethylaminopropyl chloride in 75 ml. of dry 2-propanol was added dropwise to a rapidly refluxing solution of 7.38 g. (0.03 mole) of fluorenylphosphonic acid in 100 ml. of 2-propanol with stirring. The resulting mixture was allowed to reflux slowly for twelve hours. The solvent was then removed leaving a thick yellow oil which was treated with 5% sodium carbonate solution and extracted with several 50 ml. portions of ethyl ether. The combined ether extracts were heated at 75° (15 mm.) for two hours in order to remove the unreacted 3-diethylaminopropyl chloride. The resulting light-colored oil was dissolved in 30 ml. of absolute ether and ethereal hydrogen chloride was then added dropwise. After discarding the first oily precipitate, a portion of the precipitate was solid and only slightly hygroscopic. Several recrystallizations from dry methanol-ethyl acetate gave 1.8 g. (11%) of the colorless solid salt which melted at 153–154° (evac. tube).

*Analysis.*—Calcd. for $C_{27}H_{43}Cl_2N_2O_3P$: C, 59.44; H, 7.95; Cl, 13.00. Found: C, 59.10; H, 7.77; Cl, 12.74.

I claim:

1. Method for the preparation of compounds of the general formula

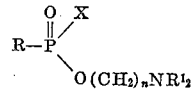

in which R is a member selected from the group consisting of phenyl, 9-fluorenyl and benzhydryl, $n$ is a whole number from 2 to 3, $R^1$ is an alkyl group having from 1 to 2 carbon atoms and X is a member selected from the group consisting of phenyl, O-ethyl and

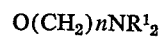

which comprises refluxing a first anhydrous isopropyl alcohol solution of a compound of the formula

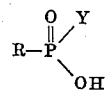

in which R is a member selected from the group consisting of phenyl, 9-fluorenyl and benzhydryl, and Y is a member selected from the group consisting of hydroxyl, O-ethyl and phenyl, and slowly adding thereto a second anhydrous isopropyl alcohol solution of a dialkylaminoalkyl chloride of the formula $Cl(CH_2)nNR^1_2$ in which $n$ is a whole number from 2 to 3 and $R^1$ is an alkyl group having from 1 to 2 carbon atoms.

2. Method as defined in claim 1 in which R is phenyl and Y is phenyl.

3. Method as defined in claim 1 in which R is benzhydryl and Y is hydroxyl.

4. Method as defined in claim 1 in which R is benzhydryl and Y is $OC_2H_5$.

5. Method as defined in claim 1 in which R is 9-fluorenyl and Y is —OH.

6. Method as defined in claim 1 in which R is phenyl, Y is phenyl, $R^1$ is methyl and $n$ is 2.

7. Method as defined in claim 1 in which R is phenyl, Y is phenyl, $R^1$ is ethyl and $n$ is 2.

8. Method as defined in claim 1 in which R is phenyl, Y is phenyl, $R^1$ is ethyl and $n$ is 3.

9. Method as defined in claim 1 in which R is benzhydryl, Y is —$OC_2H_5$, $R^1$ is methyl and $n$ is 2.

10. Method as defined in claim 1 in which R is benzhydryl, Y is —OC$_2$H$_5$, R$^1$ is ethyl and $n$ is 2.

11. Process as defined in claim 1 in which R is 9-fluorenyl, Y is hydroxyl, R$^1$ is ethyl and $n$ is 3.

12. 2-diethylaminoethyl ethyl benzhydrylphosphonate.

13. 2-dimethylaminoethyl ethyl benzhydrylphosphonate.

14. Bis(3-diethylaminopropyl) 9-fluorenylphosphonate.

15. 2-diethylaminoethyl ethyl benzhydrylphosphonate methiodide.

16. 2-dimethylaminoethyl ethyl benzhydrylphosphonate hydrochloride.

17. Bis(3-diethylaminopropyl) 9-fluorenyl-phosphonate hydrochloride.

References Cited in the file of this patent

UNITED STATES PATENTS

| 2,494,283 | Cassaday et al. | Jan. 10, 1950 |
| 2,570,503 | Tawney | Oct. 9, 1951 |
| 2,760,937 | McDermott | Aug. 28, 1956 |

FOREIGN PATENTS

| 684,977 | Great Britain | Dec. 31, 1952 |

OTHER REFERENCES

Bost et al.: J. Am. Chem. Soc., 73, 24 (1951).

Bost et al.: J. Org. Chem., vol. 18, pp. 362–6, April 1953.